(12) United States Patent
Hoymann et al.

(10) Patent No.: US 9,655,140 B2
(45) Date of Patent: May 16, 2017

(54) SEARCH AREA BASED CONTROL CHANNEL MONITORING

(75) Inventors: Christian Hoymann, Aachen (DE); George Jöngren, Sundbyberg (SE); Lars Lindbom, Karlstad (SE); Stefan Parkvall, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 31 days.

(21) Appl. No.: 14/114,540

(22) PCT Filed: May 3, 2012

(86) PCT No.: PCT/EP2012/058164
§ 371 (c)(1),
(2), (4) Date: Oct. 29, 2013

(87) PCT Pub. No.: WO2012/150310
PCT Pub. Date: Nov. 8, 2012

(65) Prior Publication Data
US 2014/0112252 A1    Apr. 24, 2014

Related U.S. Application Data

(60) Provisional application No. 61/481,975, filed on May 3, 2011.

(51) Int. Cl.
*H04W 72/04* (2009.01)
*H04W 72/12* (2009.01)
(Continued)

(52) U.S. Cl.
CPC ......... *H04W 74/006* (2013.01); *H04L 5/0053* (2013.01); *H04L 5/0094* (2013.01);
(Continued)

(58) Field of Classification Search
CPC .............. H04W 72/04; H04W 72/042; H04W 72/0406; H04W 72/1289; H04W 48/12;
(Continued)

(56) References Cited

U.S. PATENT DOCUMENTS 8,520,619 B2 * 8/2013 Hong et al. .................. 370/329
8,520,621 B2 * 8/2013 Tee et al. ...................... 370/329
(Continued)

FOREIGN PATENT DOCUMENTS

CN   101909305 A   12/2010
CN   101971539 A    2/2011
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Physical layer for relaying operation (Release 10)", Technical Specification, 3GPP TS 36.216 V10.1.0, Dec. 1, 2010, pp. 1-15, 3GPP, France.

*Primary Examiner* — Wutchung Chu
(74) *Attorney, Agent, or Firm* — Coats & Bennett, PLLC

(57) ABSTRACT

According to an embodiment of the invention, a method of operating a control node for communication with at least one receiving node is provided. The communication is structured in frames comprising several subframes (1) which may be divided into subbands in the frequency domain. The method comprises transmitting a control channel in a search area (8) of one of the subframes (1). The search area (8) comprises a configurable time span and may span one or more of the subbands.

23 Claims, 10 Drawing Sheets

(51) Int. Cl.
*H04W 72/02* (2009.01)
*H04W 74/00* (2009.01)
*H04L 5/00* (2006.01)
*H04W 52/02* (2009.01)
*H04W 24/00* (2009.01)

(52) U.S. Cl.
CPC ... *H04W 52/0216* (2013.01); *H04W 52/0219* (2013.01); *H04W 24/00* (2013.01); *H04W 72/042* (2013.01)

(58) Field of Classification Search
CPC .............. H04W 72/005; H04W 72/12; H04W 72/0446; H04L 5/0053; H04L 5/0094; H04L 5/0032; H04L 5/0048; H04L 5/0035; H04L 5/0051; H04L 5/0044
USPC .................. 370/329, 312, 252, 336; 455/450
See application file for complete search history.

(56) References Cited

U.S. PATENT DOCUMENTS

| | | |
|---|---|---|
| 2008/0219236 A1 | 9/2008 | Love et al. |
| 2009/0154607 A1 | 6/2009 | Lindoff et al. |
| 2009/0197542 A1* | 8/2009 | Buckley ............... H04W 48/12 455/70 |
| 2009/0274077 A1* | 11/2009 | Meylan ................ H04W 28/06 370/280 |
| 2010/0281323 A1 | 11/2010 | Wang et al. |
| 2010/0290419 A1 | 11/2010 | Wengerter |
| 2011/0038275 A1* | 2/2011 | Kim .................... H04W 48/16 370/252 |
| 2011/0044391 A1* | 2/2011 | Ji et al. .................. 375/260 |
| 2011/0069637 A1* | 3/2011 | Liu et al. .................. 370/254 |
| 2011/0075624 A1* | 3/2011 | Papasakellariou et al. .. 370/329 |
| 2011/0170496 A1* | 7/2011 | Fong et al. ............... 370/329 |
| 2011/0188587 A1* | 8/2011 | Zhang et al. ............. 375/260 |
| 2011/0194412 A1 | 8/2011 | Park et al. |
| 2011/0228724 A1* | 9/2011 | Gaal .................... H04L 5/001 370/328 |
| 2011/0243090 A1* | 10/2011 | Grovlen ................ H04L 1/18 370/329 |
| 2011/0268062 A1* | 11/2011 | Ji ..................... H04L 5/0055 370/329 |
| 2012/0093063 A1 | 4/2012 | Yuan et al. |
| 2012/0099518 A1 | 4/2012 | Park et al. |
| 2012/0176884 A1* | 7/2012 | Zhang et al. ............. 370/203 |
| 2012/0281667 A1* | 11/2012 | Chang et al. ............. 370/329 |
| 2013/0039284 A1* | 2/2013 | Marinier ............... H04L 5/001 370/329 |
| 2013/0083719 A1* | 4/2013 | Seo et al. ................ 370/312 |
| 2014/0016596 A1* | 1/2014 | Kim et al. ............... 370/329 |
| 2014/0023157 A1* | 1/2014 | Shimezawa .......... H04B 7/0456 375/267 |

FOREIGN PATENT DOCUMENTS

| | | |
|---|---|---|
| CN | 102036262 A | 4/2011 |
| JP | 2011-511506 A | 4/2011 |
| RU | 2264036 C2 | 11/2005 |
| WO | 0176098 A2 | 10/2001 |
| WO | 2008157692 A2 | 12/2008 |
| WO | 2010039003 A2 | 4/2010 |
| WO | 2010053984 A2 | 5/2010 |
| WO | 2010117200 A2 | 10/2010 |
| WO | 2010141913 A2 | 12/2010 |
| WO | 2010151093 A2 | 12/2010 |
| WO | 2011035675 A1 | 3/2011 |

* cited by examiner

SEARCH AREA BASED CONTROL CHANNEL MONITORING

TECHNICAL FIELD

The present invention relates to methods for operating a control node or a receiving node and to corresponding devices for implementing the nodes.

BACKGROUND

In mobile networks, e.g., according to the Third Generation Partnership Project (3GPP), a control channel may be used to convey control information to a user equipment (UE). An example of such a control channel is the Physical Downlink Control Channel (PDCCH) as specified for 3GPP LTE (Long Term Evolution). The PDCCH is transmitted in the L1/L2 control region of a subframe. The L1/L2 control region is composed of the first, up to four, Orthogonal Frequency Division Multiplexing (OFDM) symbols of the subframe and spans the entire frequency domain.

Relaying was introduced in LTE Release 10. Since a relay node (RN) might not be able to receive the regular control channel, i.e., the PDCCH, from its donor base station (BS), in 3GPP LTE referred to as Donor eNB (DeNB), a further control channel, referred to as Relay PDCCH (R-PDCCH), was introduced. The R-PDCCH is not transmitted in the L1/L2 control region. Instead, the R-PDCCH is transmitted in the regular data region of a subframe. In the time domain, a subframe is divided into a first slot and a second slot. In the first slot, the R-PDCCH starts at the fourth OFDM symbol of the slot and ends at the end of the slot. In the second slot the R-PDCCH starts at the first OFDM symbol of the slot and ends at the end of the slot. In the frequency domain the R-PDCCH is transmitted on one or more resource blocks (RBs). Downlink (DL) assignments are transmitted on an R-PDCCH in the first slot and uplink (UL) grants are transmitted on an R-PDCCH in the second slot.

Coding, scrambling and modulation for the R-PDCCH follow the same principles as for the PDCCH. However, the mapping of the R-PDCCH to time-frequency resources is different. In a variant of the R-PDCCH which is based on UE specific Demodulation Reference Symbols (DMRS), there is no cross-interleaving of multiple R-PDCCHs in a single RB. Rather, one R-PDCCH is mapped to one set of RBs, the number of RBs, which may be 1, 2, 4 or 8, depending on the aggregation level. An example of such R-PDCCH transmission is shown in FIG. 1. Without cross-interleaving, the R-PDCCH can be transmitted on antenna ports with UE-specific DMRS.

For the R-PDCCH, DL assignments are transmitted in the first slot of a subframe and UL grants are transmitted in the second slot of a subframe. Transmitting DL assignments in the first slot and UL grants in the second slot of a subframe forces a receiver to receive during the entire subframe. Hence such a design prevents a concept referred to as micro sleep, where the receiver can power down some of its components after it has detected that there is no DL assignment in a particular subframe. Further, separating DL assignments and UL grants to be transmitted in two different slots requires one blind decoding attempt in each slot space, one for the DL assignments, transmitted with Downlink Control Information (DCI) format 1A, and one for the UL grants, transmitted with DCI format 0. Hence, it increases the total number of blind decoding attempts.

Accordingly, there is a need for techniques which allow for efficiently transmitting control information to a receiving node.

SUMMARY

According to an embodiment of the invention, a method of operating a control node for communication with at least one receiving node is provided. The communication is structured in frames comprising several subframes. The method comprises transmitting a control channel in a search area of one of the subframes. The search area comprises a configurable time span.

According to a further embodiment of the invention, a method of operating a receiving node for communication with at least one control node is provided. The communication is structured in frames comprising several subframes. The method comprises searching for a control channel in a search area of one of the subframes. The search area comprises a configurable time span.

According to a further embodiment of the invention, a control node is provided. The control node is adapted to perform the above method of operating a control node.

According to a further embodiment of the invention, a receiving node is provided. The receiving node is adapted to perform the above method of operating a receiving node.

According to a further embodiment of the invention, a control node is provided. The control node comprises a transmitter for communication with at least one receiving node. The communication is structured in frames comprising several subframes. Further, the control node comprises a controller. The controller is configured to control the transmitter to transmit a control channel in a search area of one of the subframes. The search area comprises a configurable time span.

According to a further embodiment of the invention, a receiving node is provided. The receiving node comprises a receiver for communication with a control node. The communication is structured in frames comprising several subframes. Further, the receiving node comprises a controller configured to search for a control channel in a search area of one of the subframes. The search area comprises a configurable time span.

DETAILED DESCRIPTION OF EMBODIMENTS

In the following, the invention will be explained in more detail by referring to exemplary embodiments and to the accompanying drawings. The illustrated embodiments relate to concepts for transmitting control information to a receiving node which involve search-region based monitoring of a DL control channel. In the following, the concepts will be explained by referring to embodiments which involve a mobile network according to the 3GPP LTE specifications.

Figure 1:
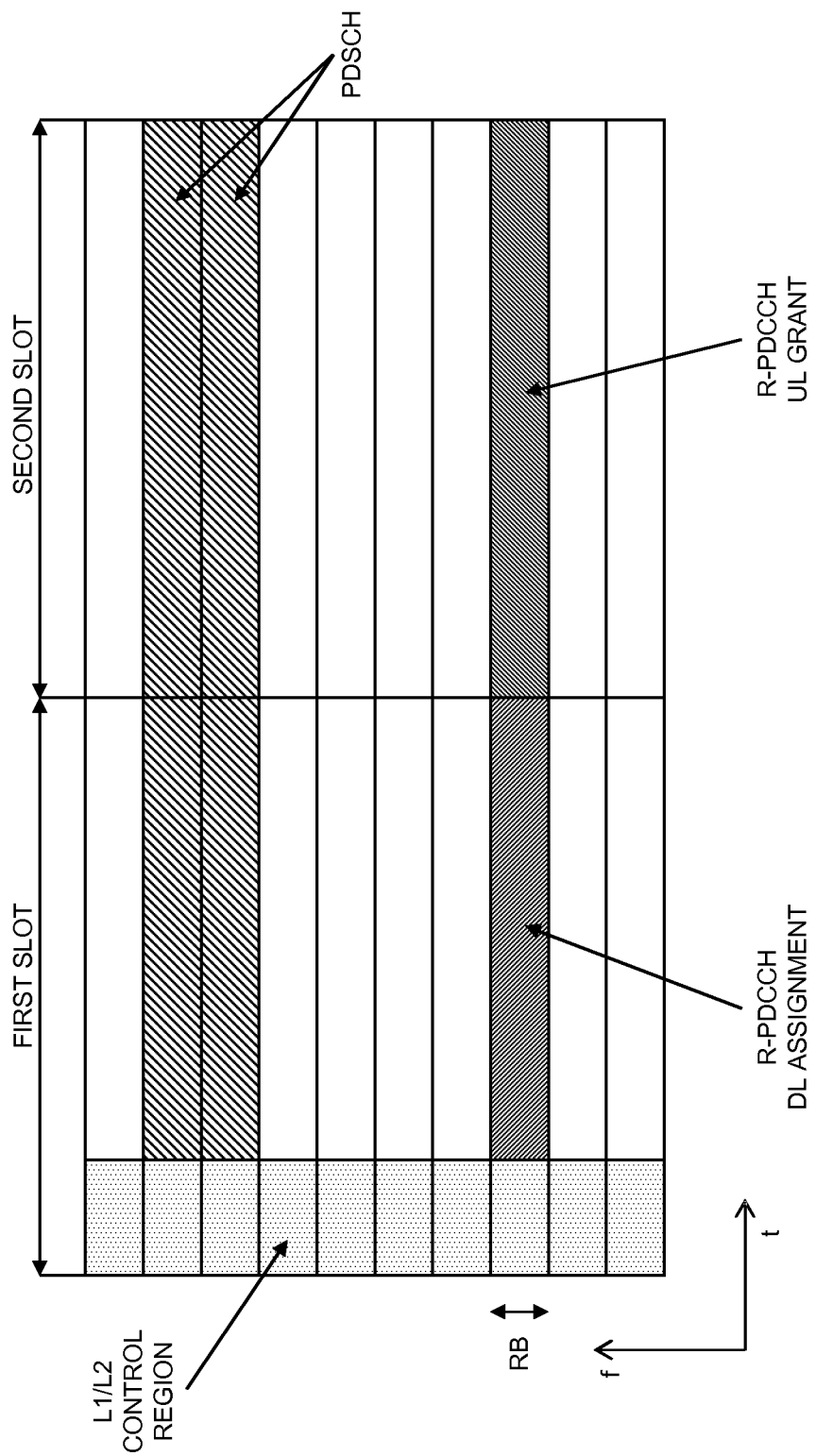
FIG. 1 schematically illustrates an example of R-PDCCH transmission according to the 3GPP Release 10 specifications for LTE.
Figure 2:
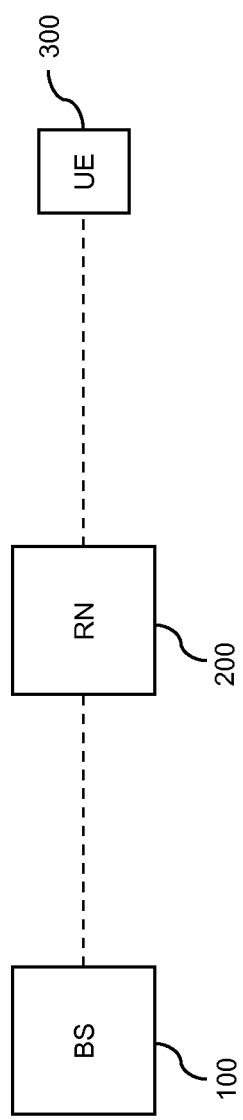
FIG. 2 schematically illustrates a mobile network environment in which concepts according to an embodiment of the invention may be applied.

FIG. 2 schematically illustrates a mobile network environment, i.e., infrastructure of a mobile network, represented by a base station (BS) 100 and a RN 200, as well as a UE 300. In accordance with the illustrated LTE scenario, the BS 100 may also be referred to as an eNB. For the RN 200, the BS 100 may act as a DeNB. This means that a network-side data connection of the RN 200 is provided by the wireless connection to the BS 100. The UE 300 may for example be a mobile phone or other type of device which can be wirelessly connected to the mobile network. The connection of the UE 300 to the mobile network can be established via the RN 200 or directly to the BS 100.

According to concepts as described herein, a DL control channel, e.g., a control channel based on UE-specific reference signals such as DMRS, may be used to transmit control information to regular UEs, e.g., to the UE 300 when not using relaying by the RN 200. In the following, the term E-PDCCH will be used as synonym for such an enhanced control channel which is based on UE specific reference signals.

One aspect of these concepts is to configure the time duration and the time domain location of the E-PDCCH and optionally connect it to other types of parameters such as the C-RNTI and the subframe number. The time duration of the E-PDCCH may in particular be shorter than the subframe duration. Furthermore, subsets of subframes can be configured in which the E-PDCCH is transmitted.

To illustrate the concepts, the communication between a BS, e.g., the BS 100, and one or more UEs, e.g., the UE 300, is considered. In cases where one or more RNs are added, such as the RN 200, the discussed principles are also applicable. In the latter case, the concepts are applied to the communication between the BS and one or more RNs, wherein the RNs take the position of the UEs or more generally of a receiving node, or to the communication between the RN and one or more UEs, wherein the RN takes the position of the BS or more generally of a control node.

Figure 3:
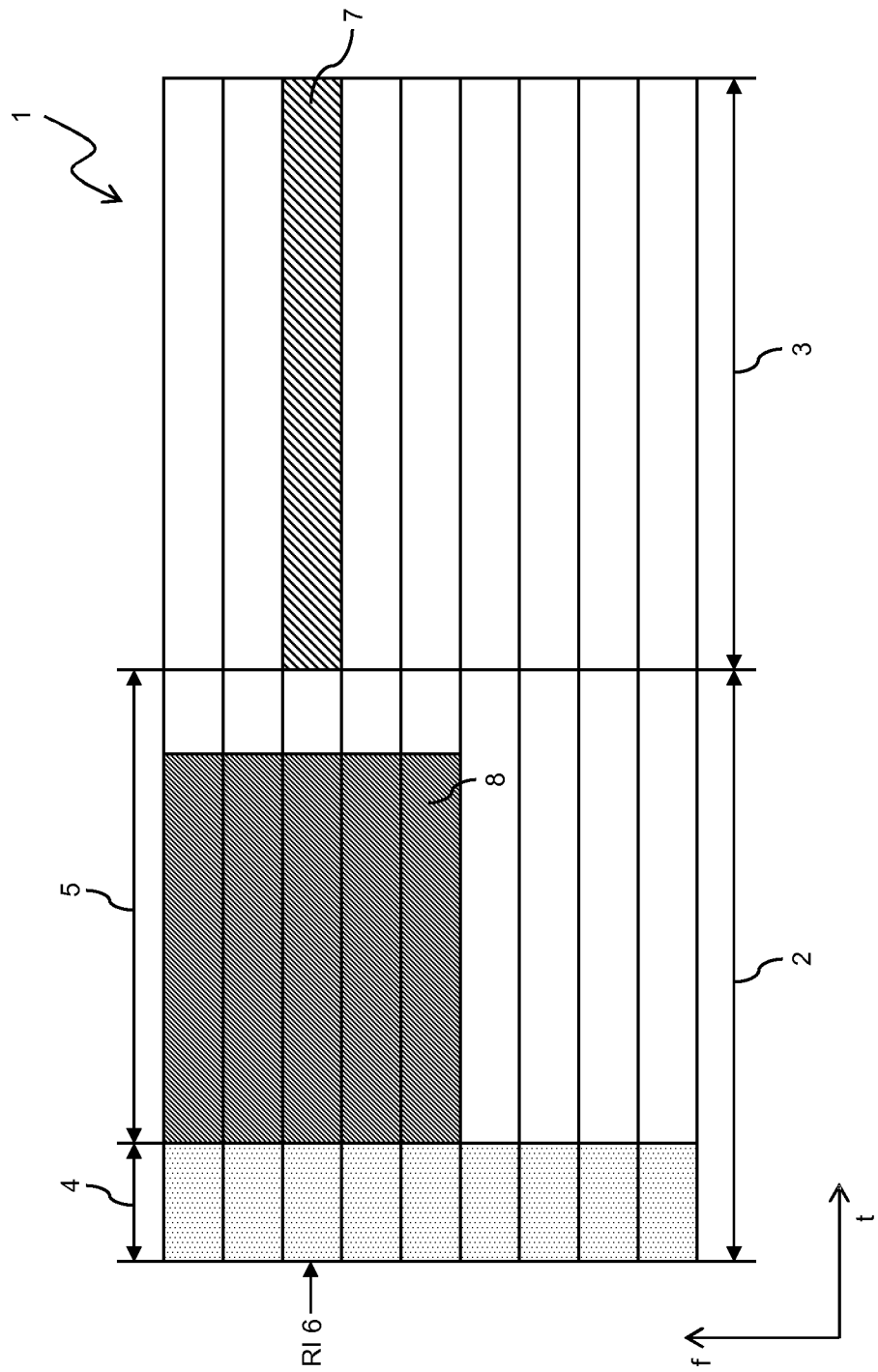
FIG. 3 shows an exemplary structure of a subframe as used in an embodiment of the invention.

The communication is generally structured in frames comprising several subframes which may be divided into subbands in the frequency domain. An example of such a subframe 1 is given in FIG. 3. In the time domain, as illustrated by time axis t, the subframe 1 is divided into a first slot 2 and a second slot 3. The first slot 2 is divided into a first part 4 and a second part 5. In the frequency domain, as illustrated by frequency axis f, the subframe 1 is divided into subbands. Each subband may be referred to by an index of a RB in the frequency domain. For example a RB 7 is can be referred to by RB index 6 in the frequency domain and the second slot 3 in the time domain. The area 8 in the subframe 1 is an example of a search area as used in the present concepts. It spans over several subbands and a certain time span.

In the illustrated concepts, multiple control channels can be transmitted by applying the concept of a search space or search area. A search space or search area is a set of candidate locations in the time-frequency grid, where the UE or RN expects a control channel transmission. One search space or search area contains the set of candidate locations for a particular aggregation level.

Figure 4:
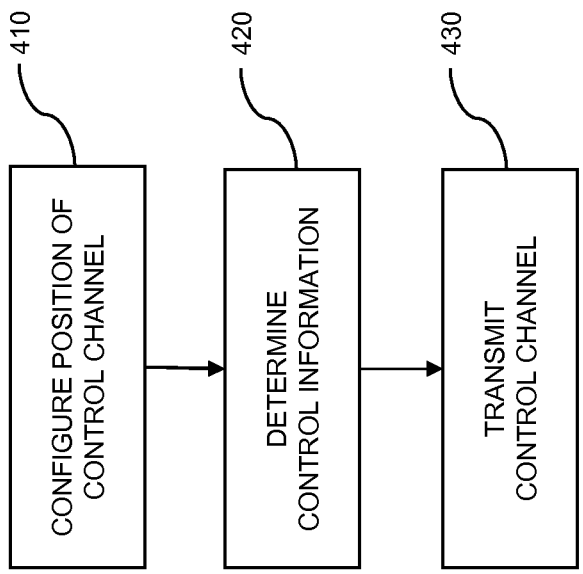
FIG. 4 shows a flowchart for illustrating a method according to an embodiment of the invention.

In an embodiment, a method for operating a control node is provided. A flowchart for illustrating the method is shown in FIG. 4. To implement the method, one or more of the steps illustrated in FIG. 4 may be performed by the control node. The control node may be a BS, an eNodeB, a DeNB, or a RN. The control node may for example correspond to the BS 100 or to the RN 200 of FIG. 2.

As illustrated by step 430, the method comprises the step of transmitting a control channel in a search area. The control channel may be the E-PDCCH. The search area comprises a configurable time span within a subframe and may span one or more subbands. The time span may be shorter than the duration of the subframe.

As further illustrated by step 410, the method may also comprise configuring a position of the control channel. The position may be configured in the time domain and/or in the frequency domain. This may comprise determining the subbands spanned by the search area in the frequency domain and/or determining the time span spanned by the search area in the time domain.

As further illustrated by step 420, the method may also comprise determining control information to be transmitted on the control channel. The control information may in particular include one or more DL assignments and one or more UL grants.

Figure 5:
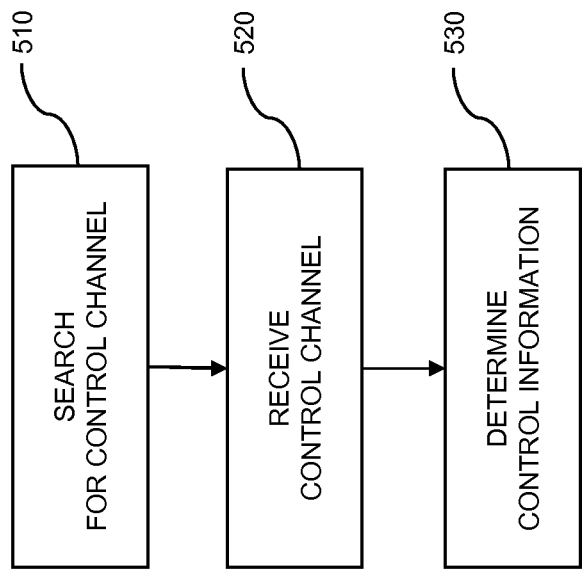
FIG. 5 shows a flowchart for illustrating a further method according to an embodiment of the invention.

According to a further embodiment, a method for operating a receiving node is provided. A flowchart for illustrating the method is shown in FIG. 5. To implement the method, one or more of the steps illustrated in FIG. 5 may be performed by the receiving node. The receiving node may be a UE, e.g., the UE 300, or a RN, e.g., the RN 200.

As illustrated by step 510, the method comprises the step of searching for a control channel in a search area. The control channel may be the E-PDCCH. The control channel may comprise one or more UL grants and one or more DL assignments. As mentioned above, the search area comprises a configurable time span within a subframe and may span one or more subbands. The time span may be shorter than the duration of the subframe.

As further illustrated by step 520, the method may also comprise the step of receiving the control channel. This may for example include performing a single blind decoding attempt to receive the UL grants and DL assignments transmitted on the control channel.

As further illustrated by step 530, the method may also comprise the step of determining control information from the received control channel. For example, this may involve determining the UL grants and DL assignments transmitted on the control channel.

In the above methods, every subframe in a frame may comprise a search area. Alternatively, only a subset of the subframes in a frame comprise a search area. The position, e.g., location in time domain, of the search area may be alternating from one subframe having a search area to the following subframe having a search area. For example, the position may alternate between the first slot and the second slot.

The position of the search area may also depend on an index of a receiving node, e.g., such that the position is alternating with different values of the index. An example of such index of the receiving node is a Cell Radio Network Temporary Identifier (C-RNTI).

The duration of the E-PDCCH may be configurable. Without cross-interleaving a single E-PDCCH may be mapped to a given RB and the duration of the E-PDCCH can be considered as the time domain dimension of the E-PDCCH search area. The configured duration of the E-PDCCH may be smaller than the entire subframe in order to allow for micro sleep. When assuming that DMRS are needed for proper demodulation of the E-PDCCH and since DMRS are present in one OFDM symbol per slot, a reasonable time unit for the time domain dimension of the search area would be a slot. That is to say, in the time domain the search area may span a time span of one slot.

However, with a modified DMRS structure, which contains DMRS in more OFDM symbols, smaller units each containing DMRS are also possible. In subframes with simultaneous PDCCH and E-PDCCH transmissions, OFDM symbols of the L1/L2 control region at the beginning of each subframe are usually not used for E-PDCCH transmissions. However, in subframes without PDCCH transmissions the E-PDCCH could occupy any OFDM symbol. Hence it could start at the very beginning of the subframe.

In addition or alternatively, the time domain location of the E-PDCCH within a subframe may be configurable. Transmitting the E-PDCCH at the beginning, e.g., in the first slot of a subframe would maximize the duration during which the UE could go to micro sleep. In other words, it can be utilized that, from an energy consumption perspective, it is beneficial to have a short period for potential control signaling and a long period for data transmission because the receiver has to power up and receive during the control period while it can power down during the data period if no DL assignment has been detected.

Furthermore, transmitting DL assignments at the beginning of a subframe would relax the timing requirements of real-time decoding of PDSCH at the receiver since the receiver can start decoding much earlier. However, if all UEs are configured to receive the E-PDCCH at the beginning of a subframe, resources for E-PDCCH transmission might get crowded, which could lead to resource shortage and increased interference. Furthermore, the rest of the subframe might not be usable so that it has to be left blank. This is the case if time-domain multiplexing of control and data in the same resource block is not possible or if there is no data to be multiplexed. Hence, it might be reasonable to configure the time domain location of the E-PDCCH in the middle or at the end of a subframe.

The time domain location of the E-PDCCH could also be configured on a larger time scale than a subframe, meaning that the E-PDCCH is only transmitted in a subset of subframes of one or more radio frames. In order to do so, the time domain location of the E-PDCCH may depend on the subframe number. In this case only a subset of subframes needs to be monitored for potential E-PDCCH transmission, which is even more power-efficient than just micro sleep on subframe level. One could consider this as micro sleep on radio frame level. For instance, when using the E-PDCCH in systems with advanced multi-antenna capability, the E-PDCCH could be configured to occur during Multicast Broadcast Single Frequency Network (MBSFN) subframes only. Such MBSFN subframes are free of cell-specific reference signals (CRS) and hence usable for DMRS based transmissions.

When using the E-PDCCH in heterogeneous networks it may also be beneficial to configure the E-PDCCH to be transmitted only in selected subframes, e.g., only in almost blank subframes. The subset of subframes in which E-PDCCH is transmitted could also be defined as a function of the subframe subsets defined for channel state information (CSI) reporting and/or measurements, e.g., in enhanced inter-cell interference coordination (eICIC) according to LTE Release 10. Another exemplary configuration is to configure the time domain location of the E-PDCCH in either odd or even numbered subframes.

The time domain location of the E-PDCCH could also be time variable, e.g., in such a way that the time domain location of the E-PDCCH within the subframe depends on the subframe number. For instance, the E-PDCCH could alternately be transmitted in the first and the second slot of odd and even numbered subframes respectively. The subframe could also be subdivided into more than two parts as described above, and the time domain location of the E-PDCCH could alternate between all of these parts.

In some scenarios, it can also be utilized that, on the cell level, each UE can be uniquely identified by its C-RNTI. For example, the number of the subframe in which the E-PDCCH for a certain UE is transmitted could be further combined with the C-RNTI. For this purpose, a UE may monitor the first slot if a condition depending on the subframe number and the C-RNTI is met, otherwise it shall monitor the second slot. This condition could for example be defined by: (subframe number+C-RNTI) mod 2=0. Such operation may be used to balance the E-PDCCH load within the subframe. It may be used to achieve a tradeoff between power-efficient UE operation in subframes where the E-PDCCH is transmitted at the beginning and efficient resource utilization at system level, because the E-PDCCH for some UEs is transmitted at the end. On system level, leaving resources unused can be avoided.

The configuration of the duration and the time domain location of the E-PDCCH may be done explicitly. For example, at lower layers L1/L2 control signaling could be used to dynamically indicate the valid configuration for the current subframe. For this purpose existing signaling may be modified or re-interpreted. For instance, the Physical Control Format Indicator Channel (PCFICH) could be used to indicate the duration of the E-PDCCH in the corresponding subframe. Here, a smaller value could indicate a smaller duration of the E-PDCCH, which would allow for larger periods of micro sleep. At higher layers, Medium Access Control (MAC), Radio Link Control (RLC), or Radio Resource Control (RRC) signaling could be used to semi-statically configure the configuration. For instance bit maps could be used to indicate certain subsets of subframes in which the E-PDCCH is transmitted. A still further possibility would be to use a static configuration.

The duration and the time domain location of the E-PDCCH may also be configured implicitly. In this case the configuration may be connected to some other type of parameter. For example, the configuration could be statically connected to the subframe number and/or to the C-RNTI as described above. A combination of explicit and implicit signaling is possible as well. For example, the eNB could configure a UE to receive the E-PDCCH in every $x^{th}$ subframe, where the period x is configurable and where the location of the E-PDCCH within the subframe is a function of the subframe number and the C-RNTI.

For achieving flexibility, the configuration may be UE specific. However, in order to lower complexity also a cell-specific configuration may be used.

In some scenarios, individual configurations for DL assignments and UL grants may be used. Due to stricter timing requirements for the real-time decoding of DL assignments and the corresponding DL data, the E-PDCCH carrying DL assignments could be configured differently from the E-PDCCH carrying UL grants. For instance, it could be beneficial to configure a UE to blindly decode DL assignments only in the first slot while it blindly decodes UL grants in both slots.

With carrier aggregation two or more carriers can be used simultaneously. The primary component carrier, also referred to as Pcell, is always present while one or more secondary component carriers, also referred to as Scell(s), can be activated and used on demand. The E-PDCCH can be used on both, the Pcell as well as the Scell. The configuration of the E-PDCCH can be transmitted on the same carrier as the corresponding E-PDCCH or the configuration can be sent on a different component carrier. In some scenarios, the Pcell may be used to configure the E-PDCCH for the Pcell and any other Scell.

Figure 6:
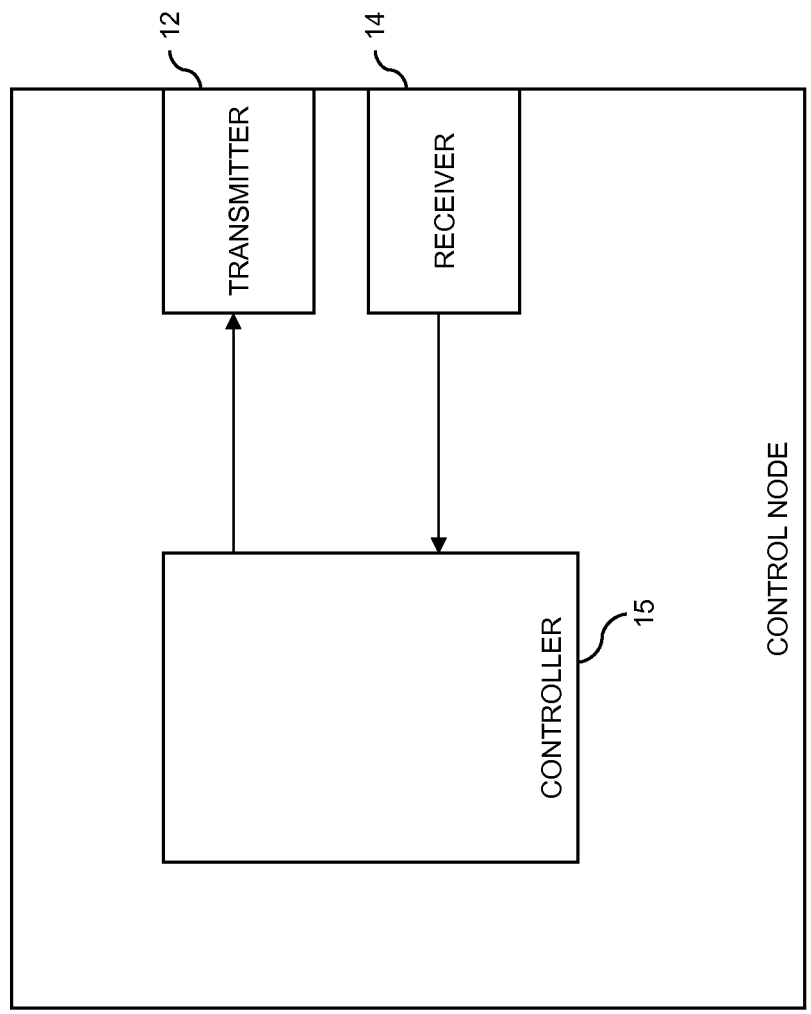
FIG. 6 schematically illustrates a control node according to an embodiment of the invention.

In a further embodiment, a control node is provided. The control node is adapted to perform the above method for operating a control node. An example of the control node is depicted in FIG. 6. As illustrated, the control node 10 includes a transmitter 12 and optionally also a receiver 14. Further, the control node 10 may include at least one processor coupled to at least one non-transitory computer-readable memory for storing computer-readable instructions. The computer-readable instructions, when executed by the at least one processor, can cause the at least one processor to perform the method for operating the control node as described herein. The processor may implement a controller 15 of the control node.

Figure 7:
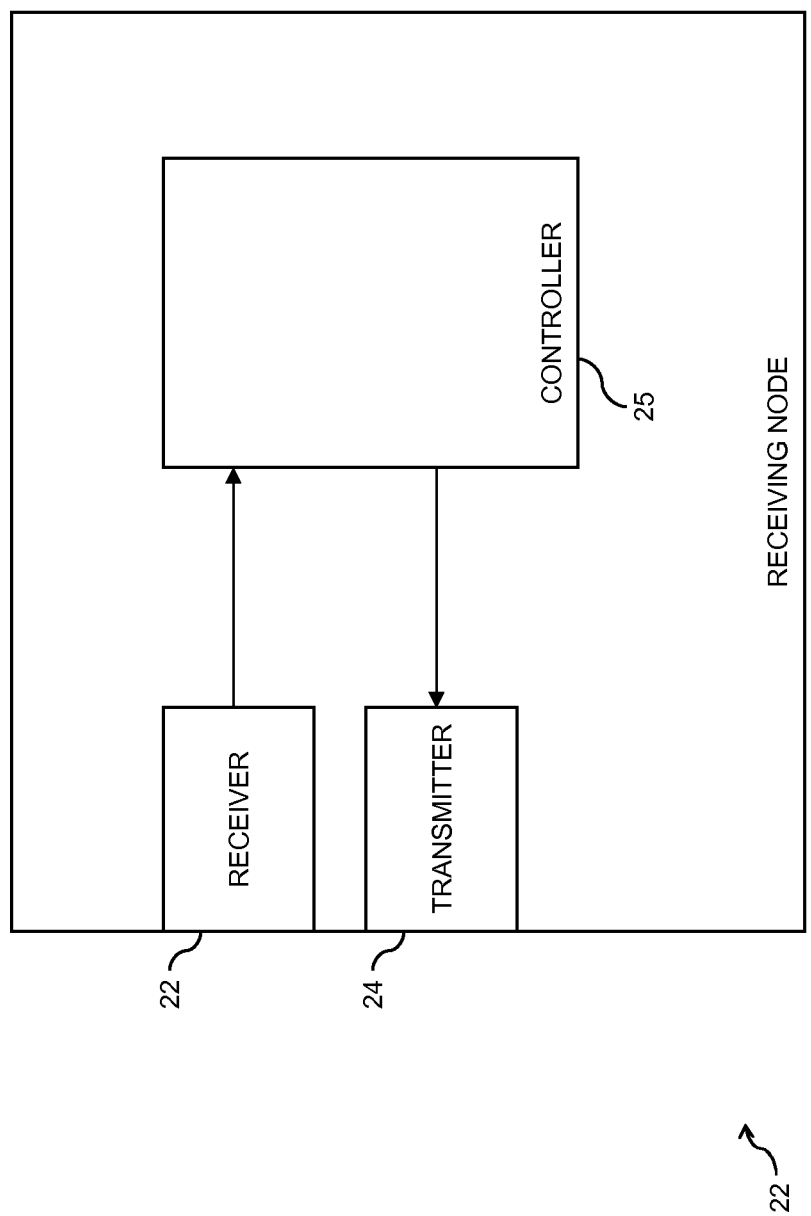
FIG. 7 schematically illustrates a receiving node according to an embodiment of the invention.

In a further embodiment, a receiving node is provided. The receiving node is adapted to perform the above method for operating a receiving node. An example of the receiving node is depicted in FIG. 7. As illustrated, the receiving node 20 includes a receiver 22 and optionally also a transmitter 24. The receiving node 20 may further include at least one processor coupled to at least one non-transitory computer-readable memory for storing computer-readable instructions. The computer-readable instructions, when executed by the at least one processor, can cause the at least one processor to perform the method for operating the receiving node as described herein. The processor may implement a controller 25 of the receiving node.

Figure 8:
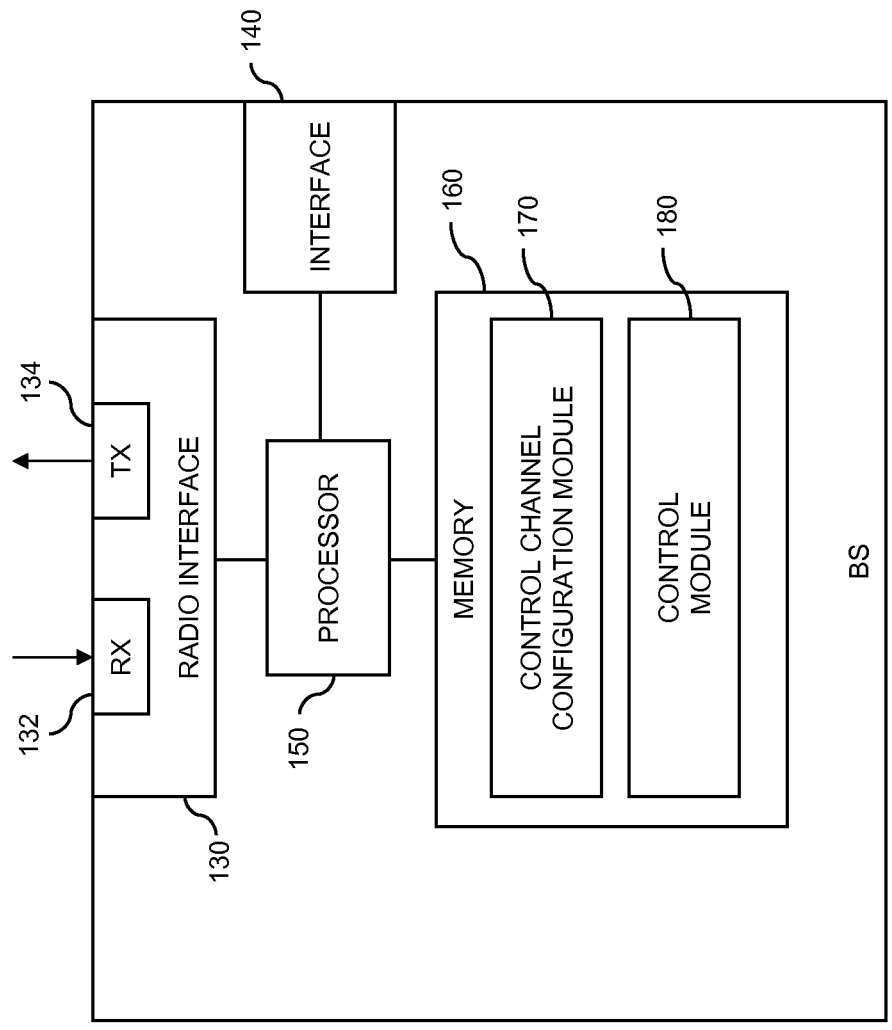
FIG. 8 schematically illustrates a base station according to an embodiment of the invention.

FIG. 8 schematically illustrates exemplary structures for implementing the above-described concepts in the BS 100. In the above-described concepts, the BS 100 may act as the control node.

In the illustrated structure, the BS 100 includes a radio interface 130 for data transmission to or from the terminal device 200. It is to be understood that for implementing transmitter (TX) functionalities the radio interface 130 may include one or more transmitters 134, and that for implementing receiver (RX) functionalities the radio interface 130 may include one or more receivers 132. The radio interface 130 may in particular be configured to transmit the above mentioned control channel. In the above-mentioned LTE scenario, the radio interface 130 may correspond to the LTE-Uu interface. Further, the BS 100 may include a control interface 140 for communicating with other nodes of the mobile network.

Further, the BS 100 includes a processor 150 coupled to the interfaces 130, 140 and a memory 160 coupled to the processor 150. The memory 160 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 160 includes suitably configured program code to be executed by the processor 150 so as to implement the above-described functionalities of the BS 100. More specifically, the memory 160 may include a control channel configuration module 170 for accomplishing the above-described configuration of the E-PDCCH, in particular with respect to the time span of the search area. Further, the memory 160 may include a control module 180 for controlling transmission of the control channel in the above-described manner.

It is to be understood that the structure as illustrated in FIG. 8 is merely schematic and that the BS 100 may actually include further components which, for the sake of clarity, have not been illustrated, e.g., further interfaces or additional processors. Also, it is to be understood that the memory 160 may include further types of program code modules, which have not been illustrated. For example, the memory 160 may include program code modules for implementing typical functionalities of a BS, e.g., known functionalities of an eNB or DeNB. According to some embodiments, also a computer program product may be provided for implementing concepts according to embodiments of the invention, e.g., a computer-readable medium storing the program code and/or other data to be stored in the memory 160.

Figure 9:
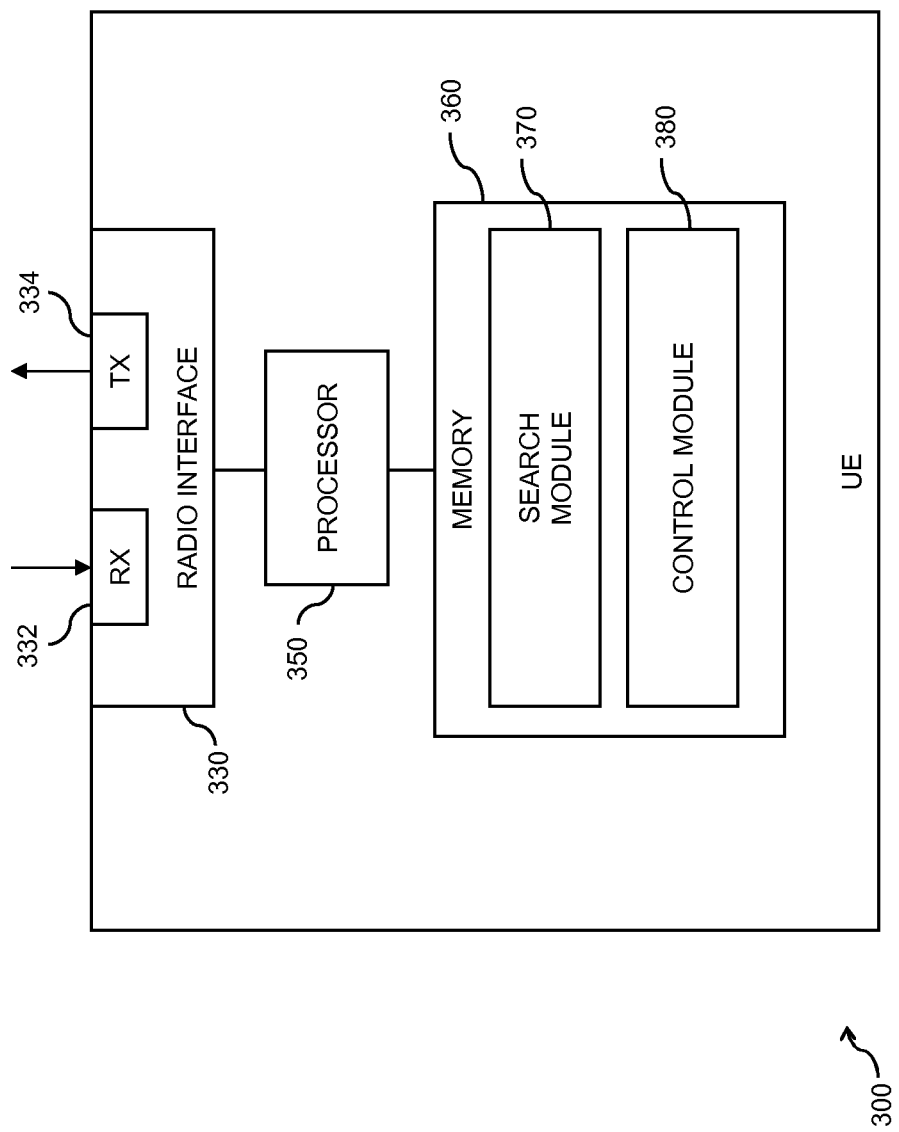
FIG. 9 schematically illustrates a UE according to an embodiment of the invention.

FIG. 9 schematically illustrates exemplary structures for implementing the above-described concepts in the UE 300. In the above-described concepts, the UE 300 may act as the receiving node.

In the illustrated structure, the UE 300 includes a radio interface 330 for performing data transmission to or from a mobile network, e.g., via the BS 100. In particular, the radio interface 330 may be configured for receiving the E-PDCCH. Further, the radio interface 330 may be configured for receiving DL data and performing transmissions of UL data. It is to be understood that for implementing transmitter (TX) functionalities the radio interface 330 includes one or more transmitters 334, and that for implementing receiver functionalities (RX) functionalities the radio interface 330 may include one or more receivers 332. In the above-mentioned LTE scenario, the radio interface 330 may correspond to the LTE-Uu interface.

Further, the UE 300 includes a processor 350 coupled to the radio interface 330 and a memory 360 coupled to the processor 350. The memory 360 may include a ROM, e.g., a flash ROM, a RAM, e.g., a DRAM or SRAM, a mass storage, e.g., a hard disk or solid state disk, or the like. The memory 360 includes suitably configured program code to be executed by the processor 350 so as to implement the above-described functionalities of the UE 300. More specifically, the memory 360 may include a search module 370 for performing the above-mentioned searching for the E-PDCCH in the search area. Further, the memory 360 may include a control module 380 for performing various control operations, e.g., controlling the UE 300 to perform UL transmissions or receive DL transmissions in accordance with control information received on the E-PDCCH.

It is to be understood that the structure as illustrated in FIG. 9 is merely schematic and that the UE 300 may actually include further components which, for the sake of clarity, have not been illustrated, e.g., further interfaces or additional processors. Also, it is to be understood that the memory 360 may include further types of program code modules, which have not been illustrated. For example, the memory 360 may include program code modules for implementing typical functionalities of a UE or program code of one or more applications to be executed by the processor 350. According to some embodiments, also a computer program product may be provided for implementing concepts according to embodiments of the invention, e.g., a computer-readable medium storing the program code and/or other data to be stored in the memory 360.

Figure 10:
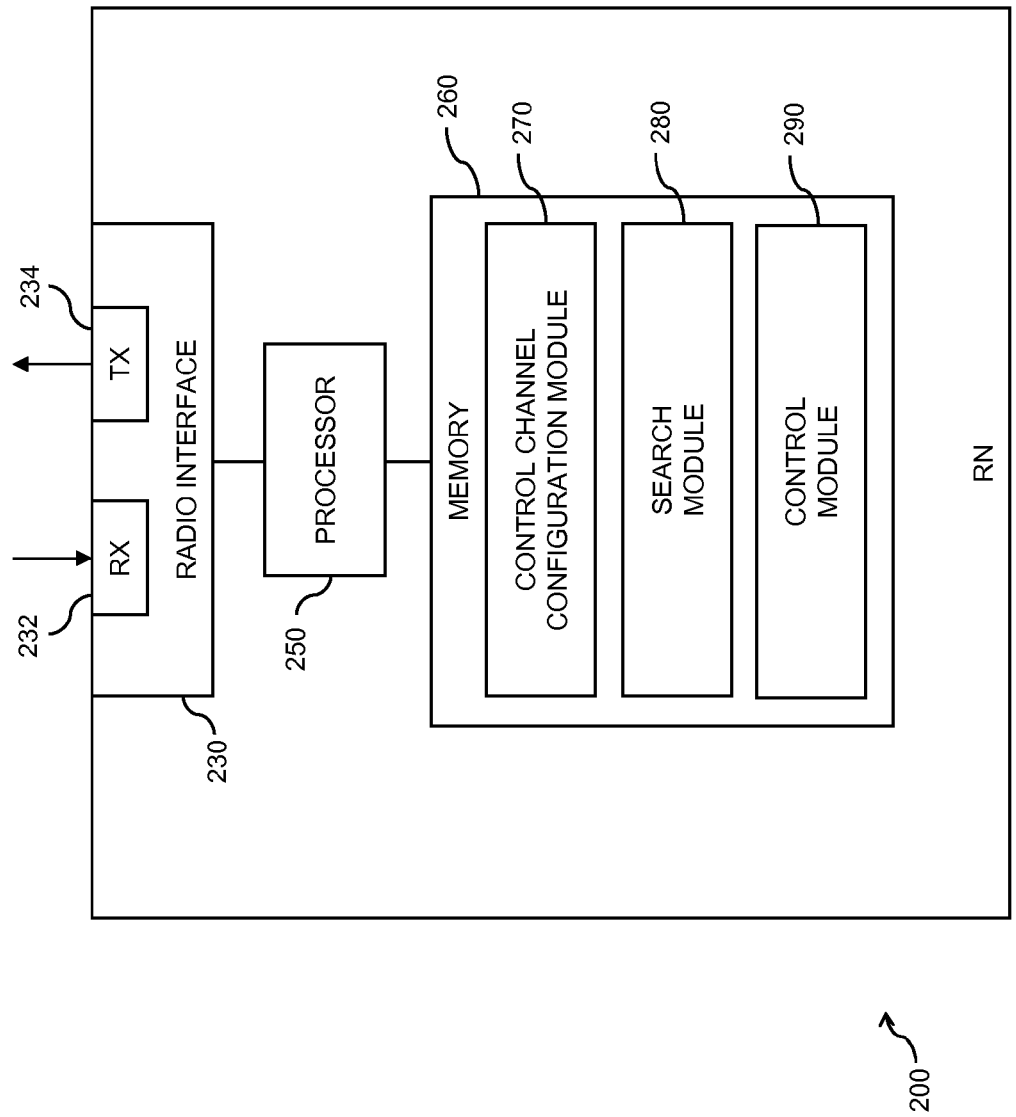
FIG. 10 schematically illustrates a relay node according to an embodiment of the invention.

FIG. 10 schematically illustrates exemplary structures for implementing the above-described concepts in the RN 200. In the above-described concepts, the RN 200 may act as the control node when considering communication between the RN 200 and a UE, e.g., the UE 300. Alternatively or in addition, the RN 200 may act as the receiving node when considering communication between the RN and its donor BS, e.g., the BS 100.

In the illustrated structure, the RN 200 includes a radio interface 230 for communicating with a donor BS, e.g., the BS 100, and for communicating with one or more UEs served by the RN 200, e.g., the UE 300.

Further, the RN 200 includes a processor 250 coupled to the control interface 340 and a memory 260 coupled to the processor 250. The memory 260 may include a ROM, e.g., a flash ROM, a RAM, e.g., a DRAM or SRAM, a mass storage, e.g., a hard disk or solid state disk, or the like. The memory 260 includes suitably configured program code to be executed by the processor 250 so as to implement the above-described functionalities of the RN 200. More specifically, the memory 260 may include a control channel configuration module 270 for accomplishing the above-described configuration of the E-PDCCH, in particular with respect to the time span of the search area. Further, the memory 260 may include a search module 270 for performing the above-mentioned searching for the E-PDCCH in the search area. Still further, the memory 260 may include a control module 290 for controlling transmission of the control channel in the above-described manner and/or for performing various control operations, e.g., controlling the RN 300 to perform UL transmissions or receive DL transmissions in accordance with control information received on the E-PDCCH.

It is to be understood that the structure as illustrated in FIG. 10 is merely schematic and that the RN 200 may actually include further components which, for the sake of clarity, have not been illustrated, e.g., further interfaces or additional processors. For example, the RN 200 may have an two radio interfaces, one for communicating with the donor BS, and the other for communicating with the served UEs. Also, it is to be understood that the memory 260 may include further types of program code modules, which have not been illustrated. For example, the memory 260 may include program code modules for implementing typical functionalities of a RN, e.g., as described in the 3GPP LTE specifications. According to some embodiments, also a computer program product may be provided for implementing concepts according to embodiments of the invention, e.g., a computer-readable medium storing the program code and/or other data to be stored in the memory 260.

As can be seen, the concepts as explained above allow for using a configurable duration and a configurable time domain location of the E-PDCCH. This in turn allows for a good trade-off between power-efficiency, e.g., power saving due to micro-sleep, UE requirements, e.g., real-time PDSCH decoding, and performance, e.g., scheduling delay due to restricted E-PDCCH transmissions. Using the E-PDCCH, DL assignments and UL grants may be transmitted in the same search area. By transmitting DL assignments and UL grants in the same search area, the number of required blind decoding attempts can be reduced. In particular, being transmitted in the same search area, DCI format 1A, i.e., a DL assignment, and DCI format 0, i.e., an UL grant, can be blindly decoded with a single attempt since both DCI formats have the same size measured in terms of the number of bits.

It is to be understood that the examples and embodiments as explained above are merely illustrative and susceptible to various modifications. For example, the concepts could be used in types of mobile network which differ from the above-mentioned examples of an LTE mobile network. Further, it is to be understood that the above concepts may be implemented by using correspondingly designed software in existing mobile network nodes or UEs, or by using dedicated hardware of such mobile network nodes or UEs.

The invention claimed is:

1. A method of operating a control node for communication with at least one user equipment, the communication being structured in frames comprising several subframes, the method comprising:
transmitting, in a search area in only a subset of the subframes, a control channel between the control node and the at least one user equipment so as to allow the at least one user equipment to refrain from monitoring a control channel in a subframe other than in the subset of the subframes so that the at least one user equipment has a reduction in power consumption, the search area comprising a configurable time span and the subset of the subframes in which the control channel is transmitted being indicated by a bit map.

2. The method according to claim 1, wherein the position of the search area depends on an index of the user equipment.

3. The method according to claim 1, wherein the position of the search area is alternating between one of the subframes having the search area and the following subframe having the search area.

4. The method according to claim 3,
wherein the subframes are divided into a first slot and a second slot in the time domain, and
wherein the position of the search area alternates between the first slot and the second slot.

5. The method according to claim 1, wherein the control channel comprises uplink grants and downlink assignments.

6. The method according to claim 1, wherein the time span is shorter than the time duration of the subframe.

7. The method according to claim 1, wherein the control node is a base station.

8. The method according to claim 1, wherein the control node is a relay node.

9. The method of claim 1, wherein the search area is in a data region of the subset of the subframes.

10. The method of claim 1, wherein the control channel is based on UE-specific reference signals.

11. The method of claim 1, wherein the control channel is an enhanced physical downlink control channel (E-PDCCH).

12. A method of operating a user equipment for communication with at least one control node, the communication being structured in frames comprising several subframes, the method comprising:
searching for a control channel in a search area in only a subset of the subframes, the search area comprising a configurable time span and the subset of the subframes in which the control channel is transmitted being indicated by a bit map; and
refraining from monitoring a control channel in a subframe other than in the subset of the subframes so as to reduce a power consumption of the user equipment.

13. The method according to claim 12, wherein the position of the search area depends on an index of the user equipment.

14. The method according to claim 12, wherein the position of the search area is alternating between one of the subframes having the search area and the following subframe having the search area.

15. The method according to claim 14,
wherein the subframes are divided into a first slot and a second slot in the time domain, and
wherein the position of the search area alternates between the first slot and the second slot.

16. The method according to claim 12, wherein the control channel comprises uplink grants and downlink assignments.

17. The method according to claim 12, wherein the time span is shorter than the time duration of the subframe.

18. The method according to claim 12, wherein the control node is a base station.

19. The method according to claim 12, wherein the control node is a relay node.

20. A control node configured to communicate with at least one user equipment with the communication being structured in frames comprising several subframes, the control node comprising a transmitter, wherein the transmitter is configured to:
transmit, in a search area in only a subset of the subframes, a control channel between the control node and the at least one user equipment so as to allow the at least one user equipment to refrain from monitoring a control channel in a subframe other than in the subset of the subframes so that the at least one user equipment has a reduction in power consumption, the search area comprising a configurable time span and the subset of the subframes in which the control channel is transmitted being indicated by a bit map.

21. A user equipment configured to communicate with at least one control node, the communication being structured in frames comprising several subframes, the user equipment comprising a controller, wherein the controller is configured to:
search for a control channel in a search area in only a subset of the subframes, the search area comprising a configurable time span and the subset of the subframes in which the control channel is transmitted being indicated by a bit map; and
refraining from monitoring a control channel in a subframe other than in the subset of the subframes so as to reduce a power consumption of the user equipment.

22. A control node, comprising:
a transmitter for communication with at least one user equipment, the communication being structured in frames comprising several subframes; and
a controller configured to control the transmitter to transmit a control channel in a search area in only a subset of one of the subframes so as to allow the at least one user equipment to refrain from monitoring a control channel in a subframe other than in the subset of the subframes so that the at least one user equipment has a reduction in power consumption, the search area comprising a configurable time span and the subset of the subframes in which the control channel is transmitted being indicated by a bit map.

23. A user equipment, comprising:
a receiver for communication with a control node, the communication being structured in frames comprising several subframes; and
a controller configured to:
search for a control channel in a search area in only a subset of the subframes, the search area comprising a configurable time span and the subset of the subframes in which the control channel is transmitted being indicated by a bit map; and
refrain from monitoring a control channel in a subframe other than in the subset of the subframes so as to reduce a power consumption of the user equipment.

* * * * *

UNITED STATES PATENT AND TRADEMARK OFFICE
CERTIFICATE OF CORRECTION

PATENT NO. : 9,655,140 B2  
APPLICATION NO. : 14/114540  
DATED : May 16, 2017  
INVENTOR(S) : Hoymann et al.

Page 1 of 1

It is certified that error appears in the above-identified patent and that said Letters Patent is hereby corrected as shown below:

In the Specification

In Column 1, Line 45, delete "Symbols" and insert -- Signals --, therefor.

In Column 8, Lines 35-36, delete "functionalities (RX) functionalities" and insert -- (RX) functionalities --, therefor.

In Column 9, Line 28, delete "search module 270" and insert -- search module 280 --, therefor.

In Column 9, Line 34, delete "RN 300" and insert -- RN 200 --, therefor.

In Column 9, Lines 42-43, delete "an two" and insert -- two --, therefor.

Signed and Sealed this  
Twentieth Day of August, 2019

Andrei Iancu  
*Director of the United States Patent and Trademark Office*